United States Patent [19]

Kash et al.

[11] Patent Number: 5,744,778

[45] Date of Patent: Apr. 28, 1998

[54] TUBE HANDLING METHOD AND APPARATUS FOR CUTTING MACHINE

[75] Inventors: Edward C. Kash, Sugar Land, Tex.; Jeffrey S. Schmidt, Lebanon, Ind.

[73] Assignee: G&H Diversified Manufacturing, Inc., Indianapolis, Ind.

[21] Appl. No.: 626,500

[22] Filed: Apr. 2, 1996

[51] Int. Cl.⁶ .................................................. B23K 26/00
[52] U.S. Cl. ........................... 219/121.67; 219/121.82; 82/127
[58] Field of Search ................... 219/121.67, 121.68, 219/121.72, 121.78, 121.8, 121.82; 82/127, 162, 130, 124, 163, 164; 414/14–17

[56] References Cited

U.S. PATENT DOCUMENTS

| | | | |
|---|---|---|---|
| 2,264,651 | 12/1941 | Webb | 82/130 |
| 2,427,322 | 9/1947 | Darner | 82/130 |
| 4,317,021 | 2/1982 | Walch et al. | 219/121.67 |
| 4,321,845 | 3/1982 | Szabo et al. | 82/127 |
| 4,324,162 | 4/1982 | Uehara | 82/127 |
| 4,346,945 | 8/1982 | Tsuboi | 82/127 |
| 4,464,918 | 8/1984 | Meehan | 414/17 |
| 4,522,091 | 6/1985 | Toffolon | 82/162 |
| 4,609,807 | 9/1986 | Morrissy et al. | 219/121.67 |
| 5,386,097 | 1/1995 | Ruckl | 219/121.82 |

FOREIGN PATENT DOCUMENTS

| | | | |
|---|---|---|---|
| 4124546 | 1/1993 | Germany | 219/121.8 |
| 59-85393 | 5/1984 | Japan | 219/121.67 |
| 677332 | 5/1991 | Switzerland | 219/121.67 |

OTHER PUBLICATIONS

"Bystronic Byflex CNC Laser Centre", Bystronic Inc., 30 Commerce Drive, Hauppauge, NY 11788 no date available.

*Primary Examiner*—Teresa J. Walberg
*Assistant Examiner*—Gregory L. Mills
*Attorney, Agent, or Firm*—Woodard, Emhardt, Naughton, Moriarty & McNett

[57] ABSTRACT

A laser cutting machine has a tube stock support bearing assembly on the cutting head itself. The support bearing assembly includes an indexing plate rotatable on the stock rotating axis, and an array of circularly-spaced, spring-loaded centering rollers permitting longitudinal movement of the tube through the bearing assembly. A pneumatically-operated stock gripper on the cutting head immediately adjacent the support bearing assembly enables the head to pull stock to any desired position on the horizontal axis. Another bearing assembly like the first, is at the left-hand end of the machine, both assemblies being adapted to various cross-sectional shapes of stock. A pneumatically operated stock gripper and feed apparatus, and a pneumatic-chucking, electric-rotating chuck assembly are associated with the steady rest bearing assembly at the left-hand end of the machine. The feeder moves stock through the chuck to be gripped by the head-mounted gripper. A length of stock is pulled by the head-mounted gripper through the chuck and steady rest bearing assembly to a desired position on the X-axis of the machine, following which, the chuck is closed, the head-mounted stock gripper is released, the chuck rotary drive begins and the laser cutting begins. A rotational indexing detent and cooperating pneumatic rotational brake are provided.

10 Claims, 7 Drawing Sheets

TUBE HANDLING METHOD AND APPARATUS FOR CUTTING MACHINE

BACKGROUND OF THE INVENTION

1. Field of the Invention

This invention relates generally to tube cutting machines and more particularly to a method facilitating and expediting the handling of tubing during cutting procedures on it.

2. Description of the Prior Art

Various types of machines have been used for many years to cut tubing. In recent years, it has been found practical to make cuts of various types and shapes precisely through tubing by the use of a laser cutting machine. Such machines can be used to make cuts and notches at spaced points along a tube, as well as cutting off the end of the tube. One example of such a machine is the BYFLEX Model 4215-3 machine by Bystronic, Inc. of Hauppauge, New York. That machine uses a frame with a first carriage on it for movement in an X-axis direction, and a second carriage on the first carriage for movement relative thereto in the Y-axis direction, both carriages moving in horizontal planes. The laser cutting head is mounted on the second carriage. Workpiece support means are provided in front of the first carriage guideway to support flat sheet stock while the cutting head is moved over the stock in the X and Y axis directions as required to provide the desired pattern of cuts to be made in sheet stock. For handling tube stock, a power operated chuck is bracket-mounted on the frame to the left of the workpiece support means and the bracket can be swung into position and clamped there for the chuck to rotate tube stock on a horizontal axis parallel to the axis of the first carriage guideway. The chuck is a four-jaw key-operated chuck. A tube is fed manually through the chuck to the position desired before chucking for rotation as the cutting head is positioned and either remains stationary or is moved to make the nature of the cut desired. Stock resting cradles may be mounted along the length of the machine to support the tubing as needed during the processing. As the tube is processed, it is necessary to remove the cradles. Such procedures may require relatively constant attention by the machine operator.

It has been desirable to be able to expedite the tube cutting procedures and facilitate cutting of tubes of a variety of diameters and wall thicknesses and cross sectional shapes. The present invention is directed toward such goals.

SUMMARY OF THE INVENTION

Described briefly, according to a typical embodiment of the present invention, the laser cutting machine is provided with a stock support bearing assembly on the cutting head itself and is organized to facilitate rotation of stock in the support bearing assembly, regardless of cross sectional shape of the stock. A stock gripper is mounted to the cutting head immediately adjacent the support bearing assembly to enable the head to pull stock to any desired position on the horizontal axis. The machine is also provided with a steady rest guide bearing assembly near the left-hand end of the machine, also adapted to various cross sectional shapes of stock. A pneumatically operated stock gripper and pulling apparatus are associated with the steady rest guide bearing assembly to facilitate movement of the stock through a pneumatic chuck to enable gripping by the head-mounted gripper. A desired length of stock is then pulled by the head-mounted gripper through the chuck and steady rest guide bearing assembly to a desired position on the X-axis of the machine, following which, the chuck is closed, the head-mounted stock gripper is released, the chuck drive begins and the laser cutting begins.

DESCRIPTION OF THE PREFERRED EMBODIMENT

Figure 1:
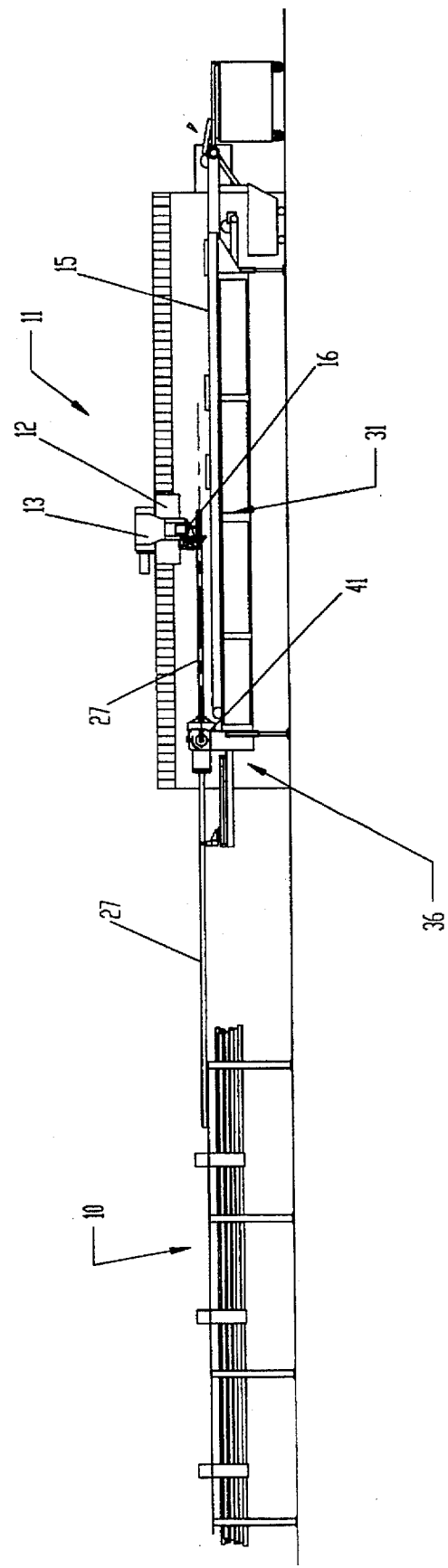
FIG. 1 is a front elevational view of the processing apparatus.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
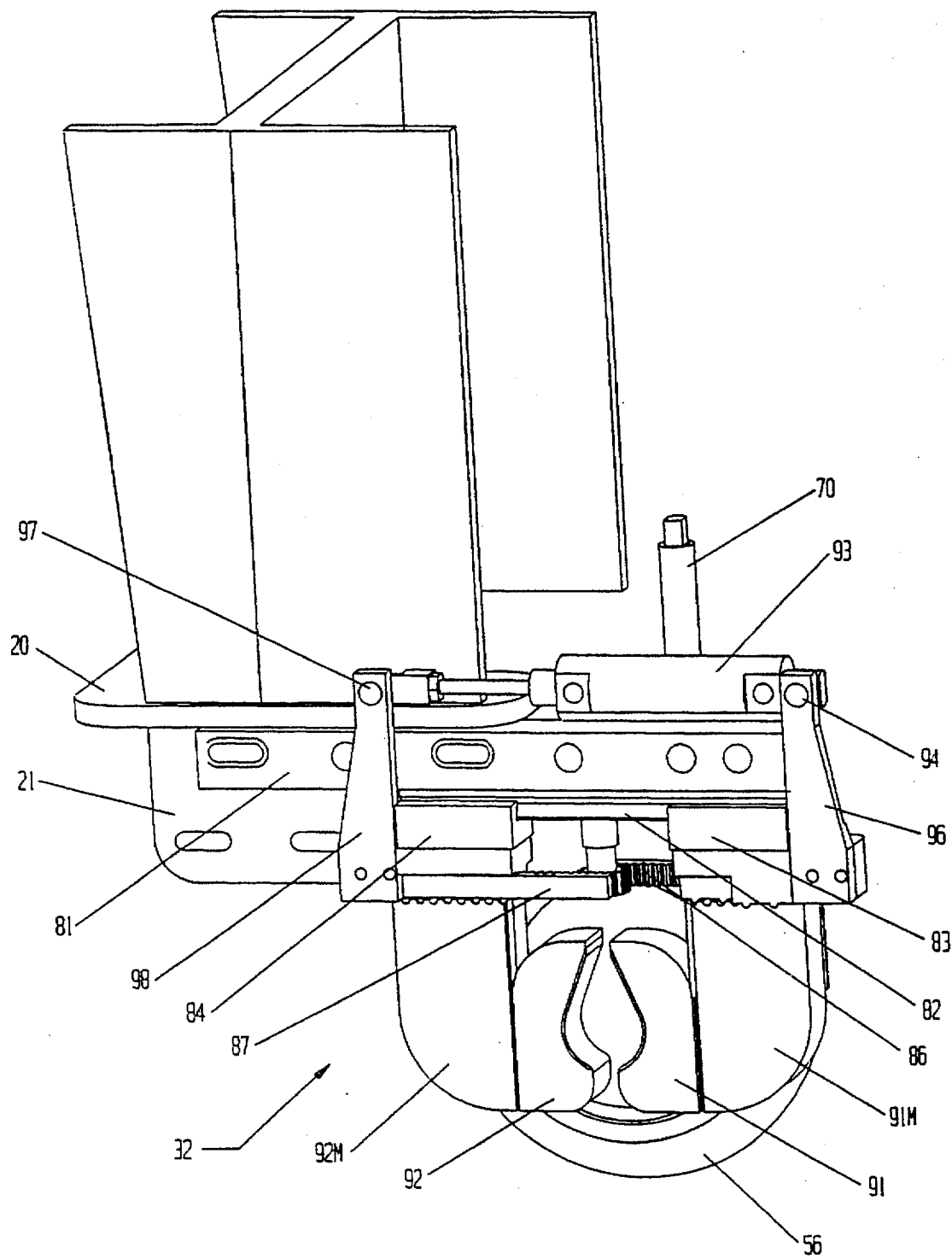
FIG. 3 is a perspective view of the head-mounted stock gripper.
Figure 5:
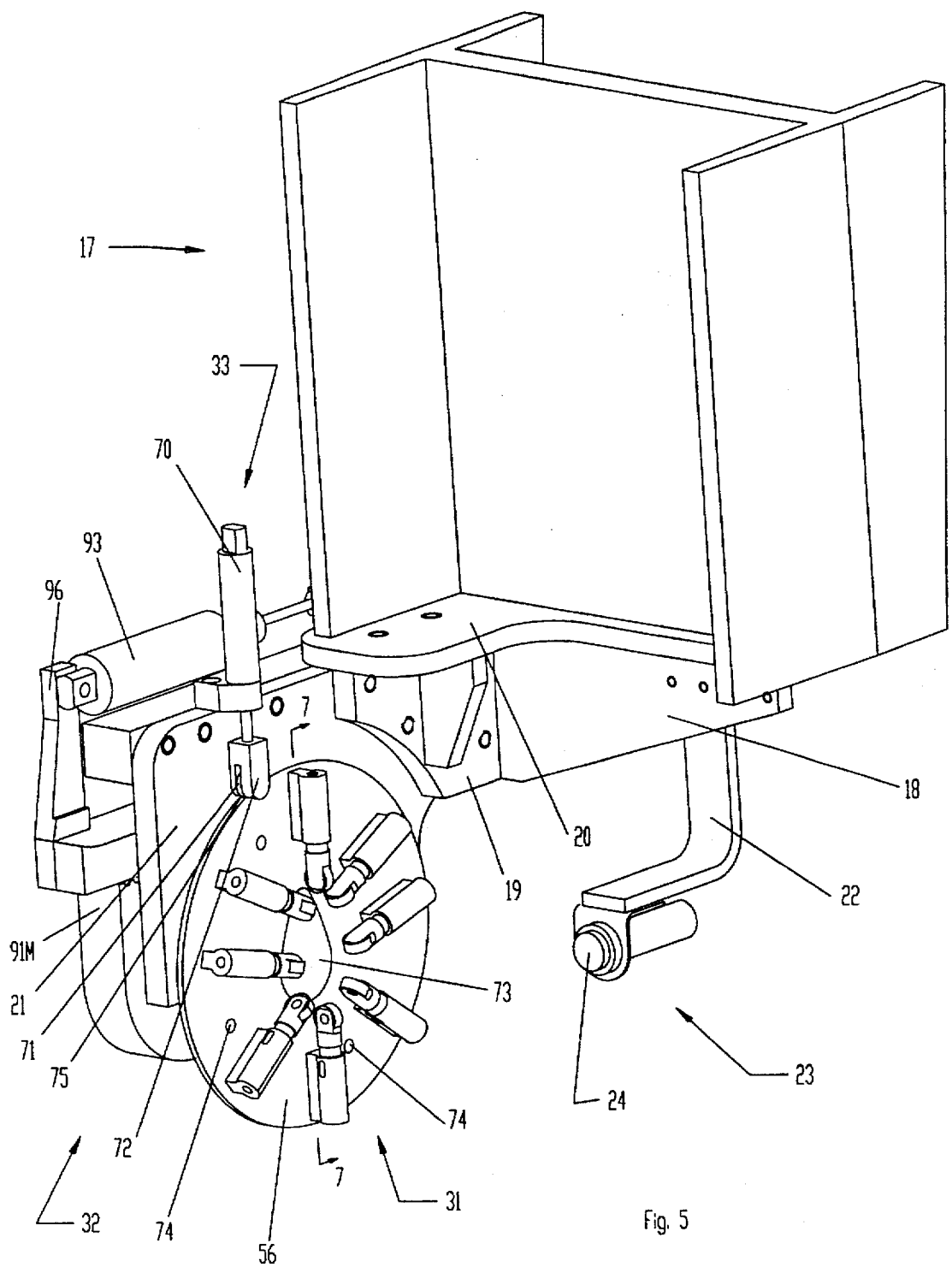
FIG. 5 is a perspective view of the head-mounted steady rest guide bearing assembly, with the head-mounted stock gripper to the left of it and partially hidden.
Figure 6:
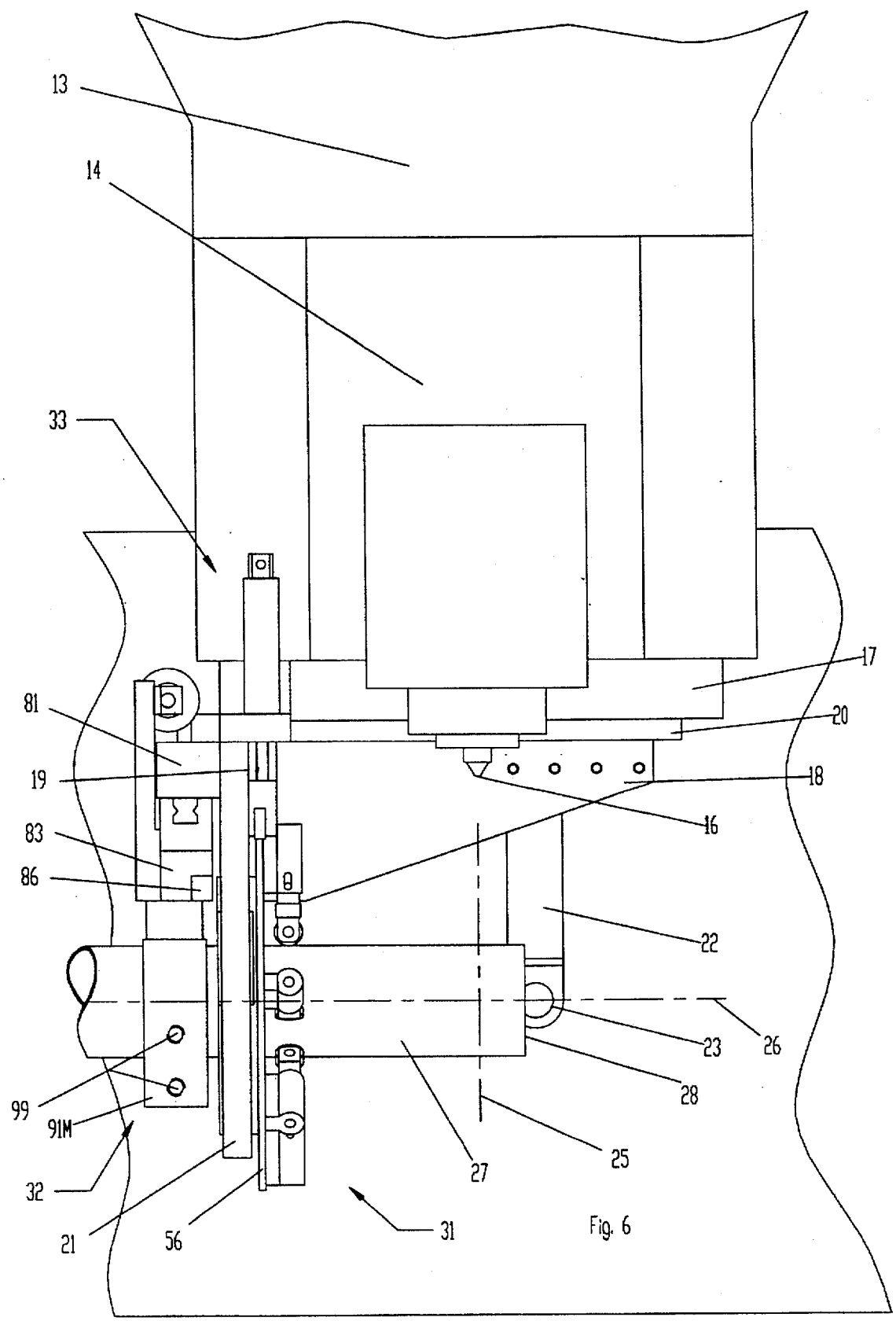
FIG. 6 is a front elevational view at a slightly larger scale than FIG. 5 and showing the cutting head assembly holding a piece of tube stock therein for processing.

Referring now to the drawings in detail, and FIGS. 1 and 6 in particular, there is a bundle loader assembly 10 with a manually operated run-in table to the left of the laser cutting machine 11, for holding a supply of tube stock. The machine 11 has X-axis guideways for an X-axis carriage 12, moving left-to-right on the drawing, and a Y-axis carriage 13 moving in-and-out (with respect to the paper) on carriage 12. The cutting head 14 is at the front of the Y-axis carriage above an endless belt conveyor 15 and supports the cutting tool which, in this instance, includes the laser beam exit port 16 from which the beam exits downward in a vertical (Z-axis 25) direction. A generally H-shaped casting 17 (FIGS. 3 and 5) is mounted on the head 14 and includes plates 18, 19, 20 and 21 which can be welded or screwed together. The plate 18 supports bracket 22 to which a proximity sensor assembly 23 is mounted, with the face 24 thereof approximately two inches horizontally behind the axis 26 defined for rotation of the tube stock to be cut. Thus it senses the leading end 28 of the tube stock as it is introduced to the cutting head.

Plate 21 serves several purposes, including the mounting of the head mounted steady rest bearing assembly 31, the head mounted stock gripper assembly 32 and the steady rest brake assembly 33.

Figure 2:
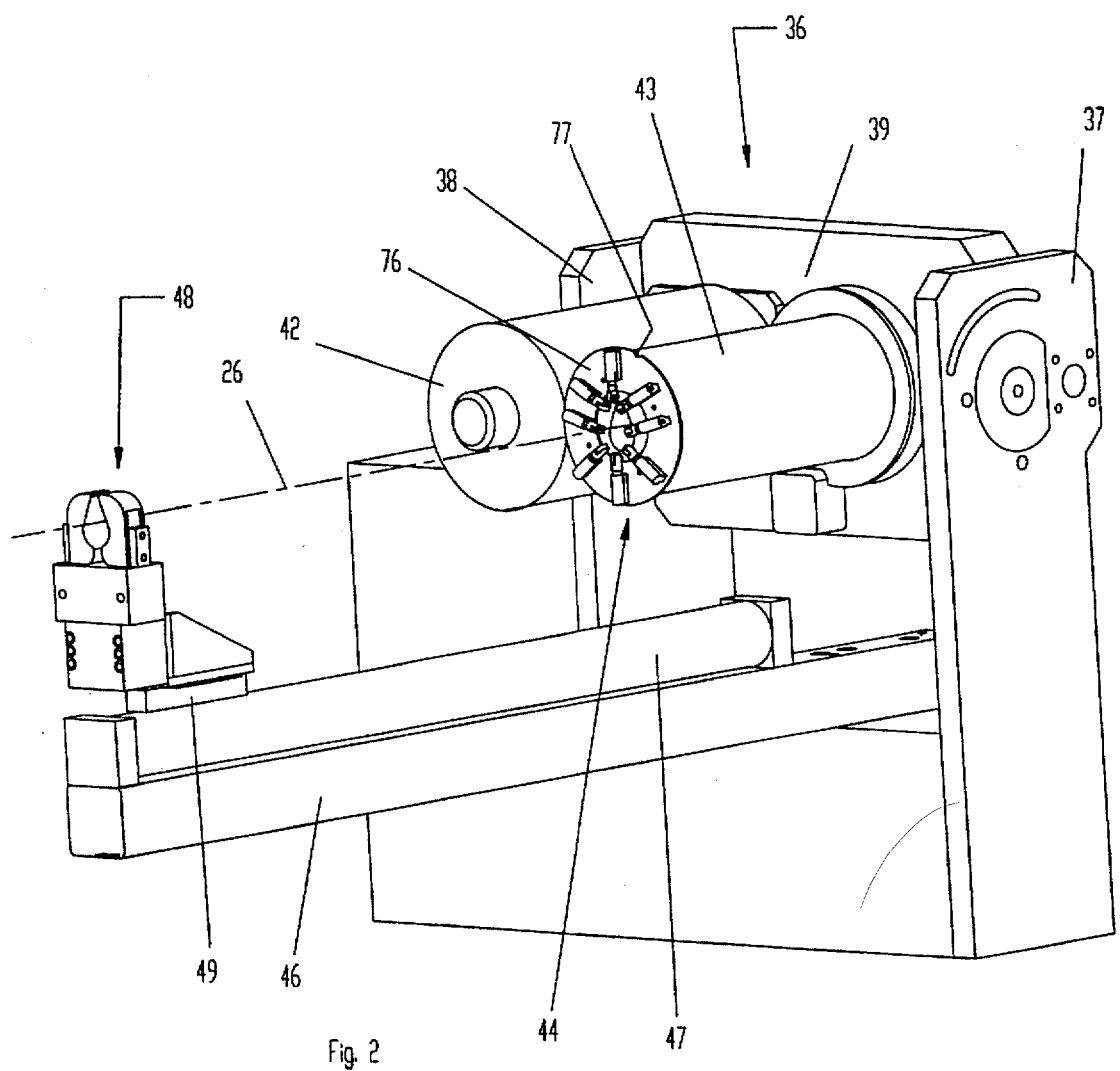
FIG. 2 is an enlarged perspective view of the left-hand end of the machine frame stock support features, including the steady rest guide bearing assembly, the feed gripper and the feed operating cylinder.

At the left-hand end of the machine, as best understood by comparing FIGS. 1 and 2, a support stand 36 is fastened to the machine frame and includes two shoulder plates 37 and 38 with a bolster 39 secured between them. A pneumatic chuck assembly 41 (FIG. 1) is rotatably mounted on the right-hand side of the bolster 39, establishing the rotational axis 26 of the stock. The electric rotary drive motor 42 (FIG. 2) for the chuck assembly is mounted on the left-hand side of the bolster.

A bearing mounting cylinder 43 is mounted to the left-hand side of the bolster, and the steady rest guide bearing assembly 44 is mounted to the left-hand end of cylinder 43. The bearing assembly 44 is centered for rotation on the axis 26, as is the chuck portion of the chuck assembly 41.

There is a cantilever bar 46 fastened to the stand 36 and extending to the left from it and which mounts a rodless pneumatic cylinder 47. A pneumatic feed gripper assembly 48 is mounted atop the slide 49 of the feed cylinder 47 and is shown at the left-hand end of the cylinder which is the "home" position from which the feed assembly advances the tube stock into the machine.

Now that the overall organization of the machine has been described, the processing will be described, followed by some detailed explanation of features of the machine facilitating the process according to the present invention.

For a machine having an X-axis carriage travel of the order of fourteen feet, the tube stock will be in lengths of from two to twenty feet. It can be of cross-sectional shapes that will fit into a diameter of 0.50 inches to 3.50 inches. It will usually be metallic tubing. Pneumatics are used to power the cylinders for the feed gripper, the feed cylinder, the rotary chuck, the head gripper and steady rest brake. The processing events in the order in which they occur are as follows:

1. The tube stock is manually loaded as a bundle into the bundle loader 10 and the bundle is broken open.

2. One end of a stock length of tubing is manually loaded onto the run-in table and moved to the right through the feed gripper assembly 48 into the steady rest guide bearing assembly 44. At this time, the feed gripper is in the wide-open (clamshell-like) loading position to easily receive the tubing from the top. As the stock is loaded, stock end 28 will be visually located by the operator while looking into a sight window in the bearing mounting cylinder 43. Then, with the lead end 28 of the tubing resting in the steady rest guide bearing assembly 44, a manual switch (not shown) is operated to pneumatically close the feed gripper onto the tubing. The tube stock is now ready for processing.

3. The cycle begins with the CNC control program of the laser cutting machines bringing the cutting head and head mounted steady rest bearing assembly 31 in-line with the axis 26 of the steady rest guide bearing assembly 44 and rotary chuck 41 to the left-hand position (load) position at the left-hand end of the travel of the head mounting carriage 12. This may be referred to as the home position of the cutting head assembly. At this time, the jaws of the head mounted gripper assembly 32 are open.

4. The machine control program then activates the feed cylinder 47 to feed the tube stock end 28 through the rotary chuck 41, the head gripper assembly 32 and the steady rest bearing assembly 31 to the proximity sensor 23 whereupon interception of the sensor beam causes the controller to stop feed of the stock (FIG. 6). This establishes a cutting reference position with respect to the laser beam exiting port 16.

5. Then the head gripper assembly 32 is activated by the CNC control to grab the tube stock. The feed gripper 48 will then release and the feed cylinder 47 will return it to load position. Then the X-axis carriage drive is activated and the cutting head gripper will draw the tube stock out from the steady rest guide bearing assembly 44 and chuck 41 to the processing start position.

6. Then the rotary chuck is activated to close and lock onto the tube stock. The head gripper 32 is opened to release the stock and the steady rest brake 33 is disabled to enable rotation of the steady rest bearing assembly 31. At this point the cutting cycle will start.

7. To make most efficient use of stock, the initial length of stock will be selected so that two sets of identical finished pieces will be made, in two identical cutting cycles of processing of the one length of stock. During the first cutting cycle on a length of stock, and depending upon the number and nature of cuts to be made on that first length of stock pulled from the chuck, the sequence of events will include the first cut near the right-hand end of the stock as the tube is rotated by the chuck. This will remove any damaged material at the lead end of the stock. Following that cut, the head is moved toward the left a prescribed distance, the laser beam is activated, and the chuck starts rotating again. As stock is cut off the end of the tubing, it drops to the top of the eight inch wide endless belt conveyor 15 and moves off to a parts storage bin or the like.

8. When the cutting head has completed the last cut of the first cutting cycle, the steady rest brake is applied. The head gripper is activated to grab the stock. The rotary chuck 41 is opened and the head will drag out the stock through the chuck to the start position for the second cycle. Then the chuck locks onto the stock. The head gripper and steady rest brake are deactivated and the second cutting cycle for this length of stock is begun. Since the last cut on the first half length of the stock is precisely known, having been made by the laser, it is not necessary to repeat the rough end cutoff step in this second cycle.

9. When the cutting head comes to the end of the second cutting cycle, the steady rest brake is activated, and the head moves to the right along the X-axis to a position where the last cut end of the stock is no longer in the steady rest bearing assembly 31, but the head gripper will grab the stock end. Then the rotary chuck is opened, and the X-axis carriage is moved to the right to drag the remaining stock (which is scrap) out of the chuck, whereupon the head mounted stock gripper releases the scrap end to drop onto the conveyor or into a scrap chute (not shown) immediately to the right of the chuck and above the upper run of the conveyor belt 15. Then the cutting head moves to the left to the load position with the head gripper open and the steady rest brake on, ready to receive a new length of stock from the feeder assembly 47–48 through the guide bearing 44 and chuck 41.

From the foregoing description, it can be recognized that there is some value in having a the stock lead end sensor close, in an X-axis direction to the laser beam axis 25. This distance is about 1.5 inches. The proximity sensor is of a self-contained emitter and sensor assembly.

Figure 7:
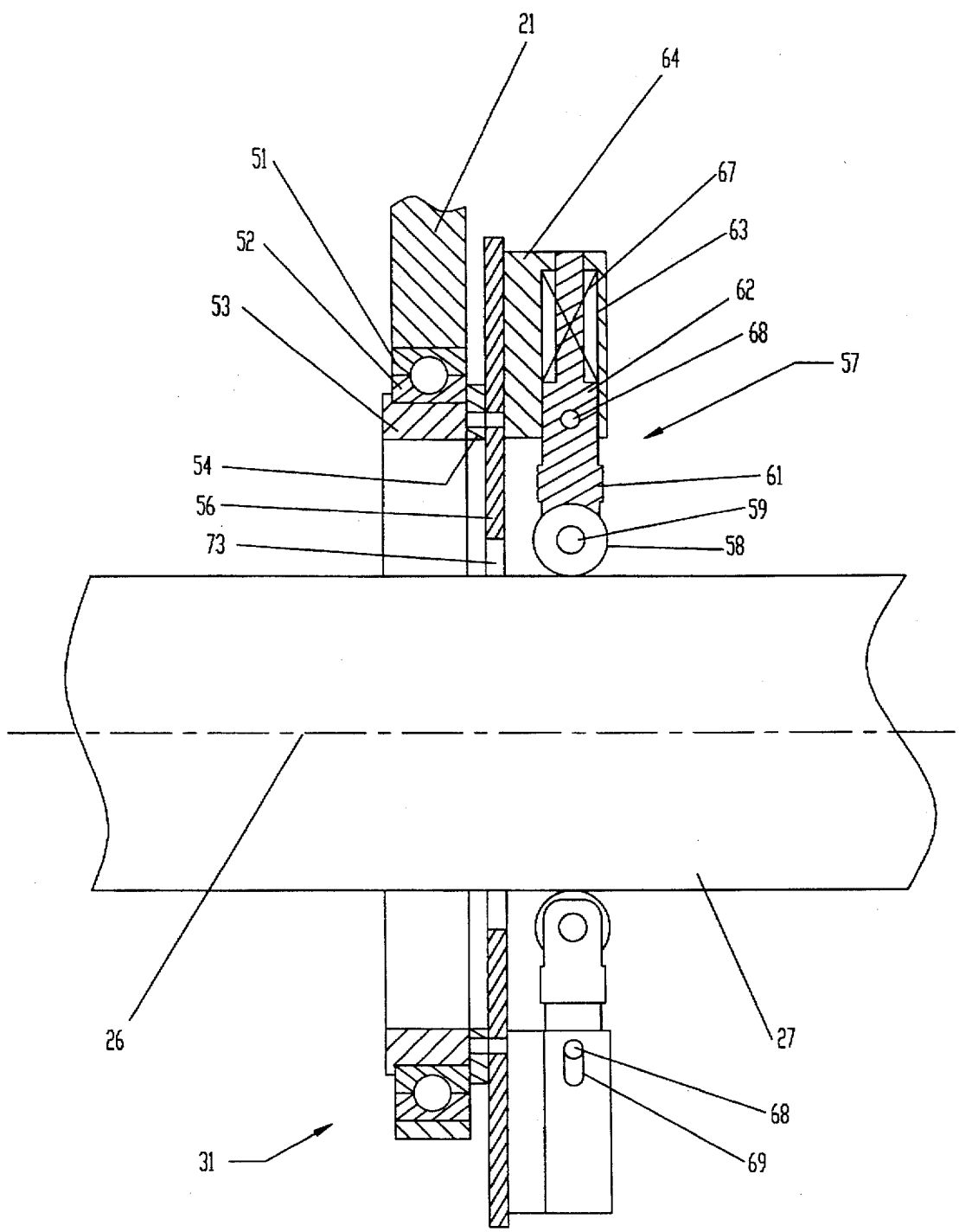
FIG. 7 is a much enlarged sectional view of the head-mounted steady rest bearing assembly taken at line 7—7 in FIG. 5 and viewed in the direction of the arrows.

The bearing assemblies 31 and 44 are of essentially the same nature. They can be better understood by comparison of FIGS. 5 and 7, where the outer race 51 of a ball bearing assembly is fixed by some suitable means in the plate 21. The inner race 52 receives a sleeve 53. A guide bearing assembly fixturing plate 56 is screwed through spacer 54 into the sleeve 53. This whole assembly of parts 51 through 56 is intended to establish the rotational axis 26 of the tube stock in the head mounted bearing assembly.

To facilitate axial movement of the stock through the head mounted bearing assembly, a set of guide bearing assemblies is employed. Since they can all be of the same general nature, a description of one will suffice for all. The guide bearing assembly 57 (FIG. 7) includes a roller 58 on a shaft 59 in a yoke 61 at the bottom of a guide rod 62 received in a guide pocket 63 in the guide block 64, screwed onto the fixturing plate 56. A coil spring 67 urges the guide rod toward the axis 26. The travel is limited by a post 68 received in a slot 69 which limits the extent of travel of the guide rod in and out of the pocket 63. Where the tube to be processed is cylindrical, a set of three (but preferably six) of these guide bearing assemblies can be mounted to the plate 56 to keep the tube stock 27 centered on the axis of the steady rest bearing assembly outer race 51, both as the tube stock is pushed through the bearing assembly and when the tube stock is rotated. For heavier tubing or non-circular shapes, additional guide bearing assemblies may be mounted on the fixturing plate 56.

Referring specifically to FIG. 5, the steady rest brake assembly 31 includes a double-acting pneumatic cylinder 70 with a piston rod connected to a plunger 72 having a roller 71 on its lower end. A detent notch 75 is provided in the periphery of the fixturing plate 56 to receive the roller 71 when the pneumatic cylinder is operated to apply the brake.

The fixturing plates, being so simply mounted by screws to the steady rest bearing assembly, can be tailor-made from stocks of circular plates of a convenient diameter, for handling different cross-sectional shapes of tubing. This can be done by first determining the shape and position of the central stock-receiver aperture relative to the center of the plate, and the location of the detent notch 75 to receive the roller 71 on the lower end of the plunger 72 of the steady rest brake assembly 33 to establish a rotational reference index for the machine controller. Then, when the desired center of rotation of the axis of the stock has been determined, and related to the center of rotation of the plate 56, the position of the mounting holes for the guide bearing mounting blocks 64 to best hold the stock precisely on the desired rotational axis, and in the right index position relative to the detent notch, is determined. Then a laser machine can be programmed and cut the screw receiver holes, (and dowel pin receiver holes if desired), for the mounting blocks 64, and the tube-receiver hole of the desired shape, such as a tear drop shape 73, for example, shown in FIG. 5. Thereupon, the guide blocks can be located in the appropriate number around the plate and appropriate distances from the rotational axis of the plate, for holding the stock in coincidence with the desired rotational axis of the stock with the rotational axis of the baring assembly when the fixturing plate 56 is fastened to the bearing assembly. Typically the guide bearing mounting blocks 64 are screwed onto the plate first, and then the fixturing plate is fastened to the head mounted guide bearing assembly by screws through the spacer ring 54 into sleeve 53 at circularly spaced locations such as 74, equally spaced around the fixturing plate 56. It is intended that the location of the guide bearing mounting blocks 64 be reasonably precise with respect to the desired rotational axis for the tubing and that the spring loading be reasonably high in order to precisely position the desired rotational axis colinear with the rotational axis of the bearing assembly 31 to securely maintain that colinear relationship as the tube is rotated by the chuck and regardless of the length of the tube supported by the steady rest bearing assembly 31 when the head is at the greatest distance away from the chuck that it will have at any time during the processing. Therefore, it is intended that all of the bearing rollers snugly engage the outside of the tube at all times, with the limit pins 68 near the end of the slot 69 closest to the axis 26. As indicated above, the spring loads are intended to be high enough for reliable centering of the desired rotational axis of the stock on the machine rotational axis, but the springs enable limited radial movement of the guide rollers relative to the machine axis to accommodate burrs at the lead end and tail end, and some mill scale or other imperfections along the length of the stock.

As mentioned above, the bearing assemblies 31 (head-mounted) and 44 (stand-mounted) are essentially the same, with the stand-mounted one being mounted in the left-hand end of tube 43 just as the head-mounted one is mounted in the plate 21. As shown in FIG. 2, the fixturing plate 76, which is comparable to the fixturing plate 56 for the head mounted guide bearing assembly, is provided with a notch 77 equivalent to the steady rest brake notch 75 in plate 56. However, since the guide rollers are mounted to the left-hand side of plate 76, in contrast to the right-hand side mounting of the guide rollers on plate 56, it should be understood that the positioning of the guide rollers and their mounting blocks on plate 76 is a mirror image of that on plate 56.

Referring now to the head-mounted stock gripper assembly 32, it includes a mounting block 81 screwed to plate 21, and having a precision slide rail 82 screwed to the bottom of it. Two double vee slide blocks 83 and 84 are slidably mounted to the rail. A gear rack 86 is fastened to block 83 and gear rack 87 is fastened to block 84. A pinion 88 affixed to a vertical shaft mounted in bearing housings 89 affixed to the bottom of guide rail 82, is engaged with both racks 86 and 87 to provide uniform movement of front and rear jaws 91 and 92, respectively, toward and away from the axis 26. So it is that the head mounted stock gripper jaws move linearly in a direction transverse to the axis 26, in contrast to the feed gripper jaws which operate in a clam shell fashion about the axis 26.

Figure 4:
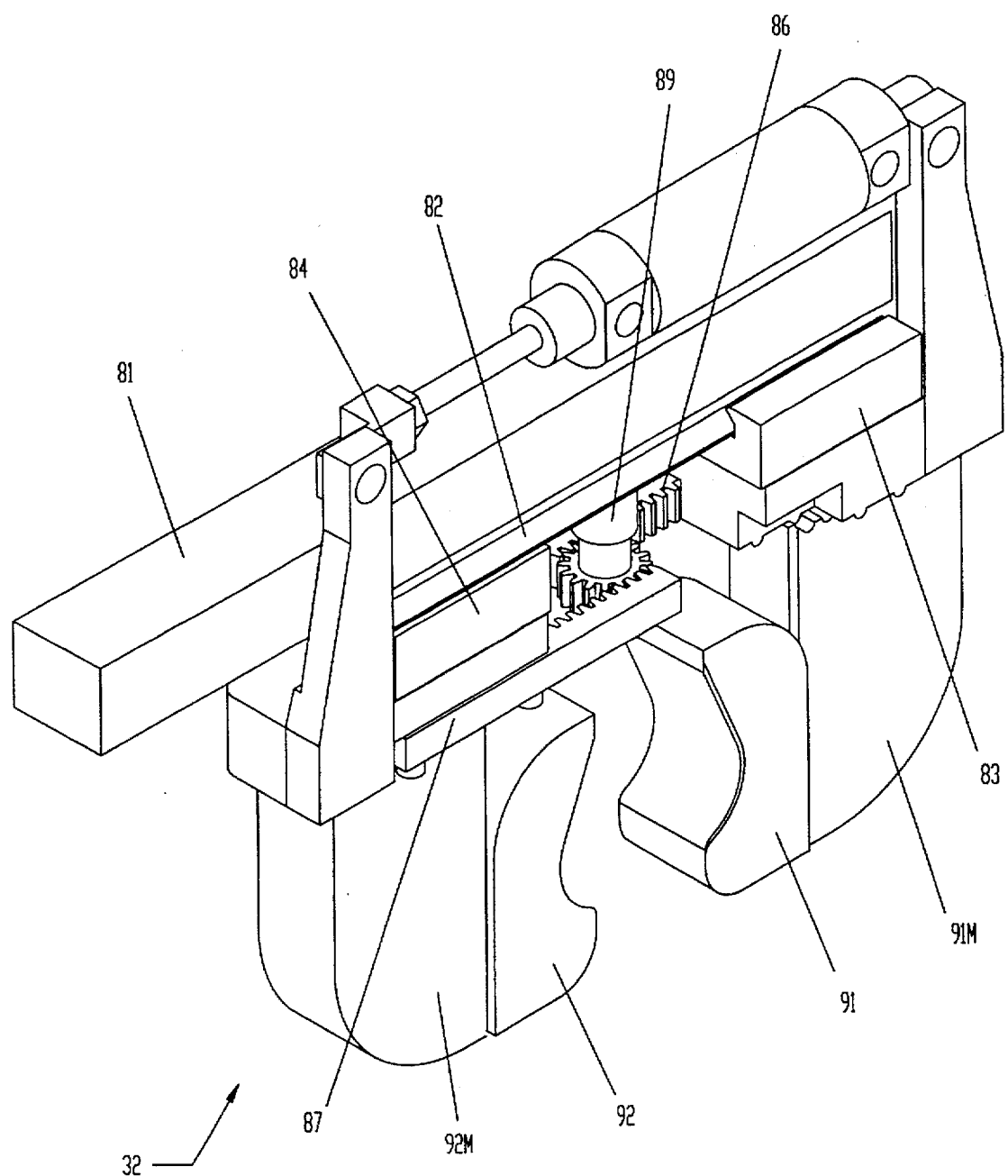
FIG. 4 is an enlarged perspective view of the head-mounted stock gripper viewed from a different angle.

To operate the gripper jaws 91 and 92, there is a pneumatic cylinder 93 having the head end pinned at 94 to the bracket 96 affixed to slide block 83. The piston rod is pinned at 97 to the bracket 98, fastened to slide block 84. As this is a double-acting pneumatic cylinder, and with the pinion 88 constantly engaged with the racks 86 and 87, the pneumatic cylinder is operable to move the jaws 91 and 92 simultaneously in a horizontal line in opposite directions perpendicular to and on opposite sides of the axis 26. Because of the fact that the apparatus can be used with tubing of various cross-sectional shapes, and fixturing plates such as 56 and 76 can be tailored to the particular shape of the tubing to be processed, so can the jaws 91 and 92 (FIG. 4) and the jaws of gripper assembly 48 be replaced by jaws of other configurations, if desired, because the jaws are screwed onto the jaw mounts 91M and 92M by a couple of screws as at 99, for example, in FIG. 6. Similarly, to adapt the chuck 41 to different cross-sectional shapes of stock, inserts can be installed on the chuck in conventional manner.

In a machine of the size indicated above, the present invention can be employed to process tubing from the right-hand end toward the left over a range of up to about fourteen feet. Depending upon the weight and rigidity of the stock being processed, it is possible that steady rests may be employed between the cutting head bearing assembly and the left-hand steady rest bearing assembly but, for most tube-processing applications, it is not necessary with the present invention.

Since laser cutting machines are typically provided with computer numerical controls (CNC), they are capable of combination X-axis and Y-axis moves according to program designed for the type and shape of cut to be made on the stock provided, of either the flat sheet type or the tube type. Therefore, the movements of the head in the X and Y axis directions as well as rotation of the chuck, can be programmed using conventional programming techniques, depending upon the nature of the cuts to be made. As indicated above, the stock can be manually placed in the stand-mounted steady rest bearing assembly, by simply taking it from the bundle loader and running it in on a simple run-in table from the bundle loader, with the operator placing the stock on the run-in table and then advancing it into position (and rotationally indexing it properly with respect to the stand-mounted steady rest guide bearing, if needed) for feeding to the head. It is also possible to automate the loading of the machine, if desired.

For purposes of example only, and without limitation, the laser cutting machine is the Bystronic ByFlex Model as indicated above.

The CNC system can be the system sold as a part of the Bystronic machine.

The pneumatic chuck 41 can be Model 315 sold by Onca of Brazil, South America.

The stock-end position sensor assembly 23 can be Model 42CA sold by Allen Bradley of Milwaukee, Wis.

The rodless pneumatic feed cylinder can be Model 40-CFR-STU5-30 by Schraeder-Bellows of U.S.A.

From the foregoing description, it should be recognized that, for most applications, the tubing can be processed in lengths up to thirteen feet without moving the head axially at all through the chuck after the processing cycle begins and without the necessity for moving cradles along with the head as cuts are made. Adaptation to various tube diameters and cross-sectional shapes can be readily made with usually six to eight roller guide bearing assemblies on the fixturing plates, regardless of cross-sectional shape of the tubing. Because of the close proximity of the head mounted gripper and bearing assembly to the beam port, the amount of scrap can be minimized, less than four inches being typical. Because of the clamp and draw features and the ability to draw so much of the stock out through the steady rest guide bearing and chuck before the processing cycle begins, processing time can be minimized. Also, because the rodless feed cylinder can advance the tube up to thirty inches, it can be programmed to adapt the feed rate and distance to the particular cycle or cycles of processing appropriate for the length of stock being used and the length of stock drawn from the chuck for each processing cycle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a machine for cutting elongate stock and having a frame and first and second carriages, the first carriage being movable on the frame along one linear axis and the second carriage being movable along the first carriage in directions transverse to the first axis, and a cutting head secured to the second carriage and including a cutting tool, the improvement combination comprising:

a first stock support in a fixed location relative to the cutting head;

a second stock support in a fixed location relative to the frame;

both stock supports permitting the stock to rotate about a processing axis parallel to the linear axis;

a first stock gripper on the cutting head;

a second stock gripper adjacent the second stock support; and a stock rotator adjacent the second stock support to rotate the stock on the processing axis;

the first stock gripper, the stock rotator and the cutting tool being disposed on a substantially straight line; and the first stock gripper being located between the first stock support and the stock rotator.

2. The combination of claim 1 and wherein:
    the first stock gripper is between the tool and the stock rotator.

3. The combination or claim 1 and wherein:
    the first stock support is located between the tool and the second stock support.

4. The combination of claim 3 and wherein:
    the second stock support is a bearing assembly mounted for rotation in a fixed location on the processing axis, and having stock confining rollers maintaining a position of the stock for rotation on the processing axis.

5. The combination of claim 1 and wherein:
    the first stock support is a bearing assembly mounted to the head for rotation on the processing axis; and
    the second stock support is a bearing assembly mounted for rotation in a fixed location on the processing axis;
    the combination further comprising a rodless pneumatic cylinder supporting the second stock gripper for movement of the stock along the processing axis into the second stock support bearing assembly.

6. The combination of claim 5 and wherein:
    the stock rotator is a chuck between the first stock gripper and the second stock support bearing assembly.

7. In a machine for cutting elongate stock and having a frame and first and second carriages, the first carriage being movable on the frame along one linear axis and the second carriage being movable along the first carriage in directions transverse to the first axis, and a cutting head secured to the second carriage, the improvement combination comprising:

a first stock support in a fixed location relative to the cutting head;

a second stock support in a fixed location relative to the frame;

both stock supports permitting the stock to rotate about a processing axis parallel to the linear axis;

a first stock gripper on the cutting head;

a second stock gripper adjacent the second stock support; and a stock rotator adjacent the second stock support to rotate the stock on the processing axis;

the first stock gripper being located between the first stock support and the stock rotator; and the first stock support being a bearing assembly mounted to the head for rotation on the processing axis, and having an array of circularly-spaced stock confining rollers maintaining a position of the stock for rotation on the processing axis;

the combination further comprising a rotational brake on the head for selectively stopping rotation of the array about the processing axis.

8. The combination of claim 7 and wherein:
    the brake includes a pneumatic actuator to selectively apply and release the brake.

9. The combination of claim 7 and wherein:
    the second stock support is a bearing assembly mounted for rotation in a fixed location on the processing axis, and having stock confining rollers maintaining a position of the stock for rotation on the processing axis; and
    the first and second stock support bearing assemblies are mirror images of each other.

10. The combination of claim 7 and wherein:
    the stock rotator is a stock turning chuck between the first and second stock supports.

* * * * *